(12) United States Patent
Francino et al.

(10) Patent No.: US 8,433,450 B2
(45) Date of Patent: Apr. 30, 2013

(54) OPTIMIZED CONTROL OF POWER PLANTS HAVING AIR COOLED CONDENSERS

(75) Inventors: Peter N. Francino, Renfrew, PA (US); Frederick C. Huff, Pittsburgh, PA (US); Harry Robert Winn, Belle Vernon, PA (US); David Glen Foster, Delmont, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 631 days.

(21) Appl. No.: 12/558,236

(22) Filed: Sep. 11, 2009

(65) Prior Publication Data

US 2011/0066298 A1    Mar. 17, 2011

(51) Int. Cl.
  *G05B 13/02* (2006.01)
  *G06N 5/02* (2006.01)
(52) U.S. Cl.
  USPC .................. 700/288; 700/28; 700/33; 700/49; 706/47
(58) Field of Classification Search .................. 700/288, 700/28, 29, 31, 33, 36, 49, 289, 290; 706/47, 706/907
  See application file for complete search history.

(56) References Cited

U.S. PATENT DOCUMENTS

| | | | | |
|---|---|---|---|---|
| 4,518,035 A | * | 5/1985 | Larinoff | 165/101 |
| 5,027,751 A | * | 7/1991 | Archer et al. | 122/449 |
| 7,190,149 B2 | * | 3/2007 | Huff et al. | 322/20 |
| 7,599,750 B2 | * | 10/2009 | Piche | 700/29 |
| 2007/0055392 A1 | * | 3/2007 | D'Amato et al. | 700/44 |

FOREIGN PATENT DOCUMENTS

| EP | 1 217 473 A1 | 6/2002 |
|---|---|---|
| GB | 2 415 809 A | 1/2006 |

OTHER PUBLICATIONS

SPX Cooling Technologies, "Air Cooled Condensers—Dry Cooling," (2011). Retrieved from the Internet on Apr. 5, 2011: URL:http://spxcooling.com/en/products/detail/air-cooled-condensers.
Wolfe et al., "Costlier, Scarcer Supplies Dictate Making Thermal Plants Less Thirsty," Power Business and Technology for the Global Generation Industry, (2008). Retrieved from the Internet on Aug. 5, 2009: URL:http://www.powermag.com/issues/features.105.html.

(Continued)

*Primary Examiner* — Jeffrey A Gaffin
*Assistant Examiner* — Steven Garland
(74) *Attorney, Agent, or Firm* — Marshall, Gerstein & Borun LLP

(57) ABSTRACT

An optimization and control system for a utility plant that uses fan based air cooled condensers controls the operation of the power generation system at the plant in conjunction with the operation of the air cooled condensers so as to run the power plant at an optimum operating point associated with minimizing or reducing the cost energy produced by the plant. The optimization and control system includes an optimizer having a numerical solver that determines values for a set of control variables associated with an optimal operating point of the plant and an expert system that oversees and modifies the control variable settings prior to providing these settings to a plant controller. The numerical solver uses an objective function and one or more models of plant equipment to determine the operating point of the plant that minimizes the cost per unit of useful energy generated by the plant.

36 Claims, 5 Drawing Sheets

OTHER PUBLICATIONS

Wurtz et al., "Air-Cooled Condensers Eliminate Plant Water Use," Power Business and Technology for the Global Generation Industry, (2008). Retrieved from the Internet on Aug. 5, 2009: URL:http://www.powermag.com/water/Air-cooled-condensers-eliminate-plant-water-use__1361.htm.

Search Report for Application No. GB1015015.9, dated Jan. 6, 2011.

* cited by examiner

OPTIMIZED CONTROL OF POWER PLANTS HAVING AIR COOLED CONDENSERS

TECHNICAL FIELD

This patent relates generally to control systems used to control utility or power plant operations, and more particularly to a control system that performs optimal control of a utility or power plant that includes air cooled condensers.

BACKGROUND

Electric power or utility plants generate electricity using any of a number of different types of power generation methodologies, and are typically categorized based on the type of raw energy they use to generate electrical power. Electrical power generation methodologies include, for example, thermal, nuclear, wind, and hydroelectric energy conversion methodologies, to name but a few. While the electric utility plants which use these various different types of power generation methodologies operate using different implementation technologies, these plants are always operated under a set of constraints applicable to the particular methodology being applied. For example, the electrical output of a thermal generator is a function of the amount of heat generated in a boiler, wherein the amount of heat is determined by the amount and type of fuel that is burned per hour. An output of a nuclear power plant is likewise dependent on the control of a nuclear fission reaction using control rods to dampen the fission process so as to create a desired level of radiation and, therefore, heat. In most cases, control of the particular operating characteristics of the plant within a range of possible operating characteristics allowed by the constraints can be performed to run the plant in a more optimal manner, such as to maximize the efficiency of the electrical generation within the plant, to minimize the cost of operating the plant, etc. However, in many cases, such optimization is performed, at best, in an ad hoc manner.

Thermal based electrical power generation plants are the most common types of utility power plants. As is known, the output of a thermal generator is dependent upon the heat transfer efficiency of the boiler used to burn fuel. In particular, fuel burning electric power generators typically operate by burning fuel to generate steam from water traveling through a number of pipes and tubes in the boiler. Here, the steam is used to drive one or more steam turbines which, in turn, create electrical energy. To maximize the use of the heat generated in the thermal process, a utility plant boiler typically contains cascaded heat exchanger sections, wherein the heat exiting from one heat exchanger section enters the following heat exchanger section. One example of constraints encountered in these types of plants (i.e., power plants using boilers or other similar steam generation technologies) that affects the efficiency of the plant includes the set points of the steam temperature used at the final super-heater and re-heater outlets of the boilers. Typically, these set points are kept constant, and it is necessary to maintain steam temperature at these points close to the set-points within a narrow range at all load levels regardless of the fuel flow to the boiler. In fact, in the operation of electric utility boilers, control of steam temperature is critical, as it is important that the temperature of steam exiting a boiler and entering a steam turbine is at an optimally desired temperature. If the steam temperature is too high, it may cause damage to the blades of the steam turbine for various metallurgical reasons. On the other hand, if the steam temperature is too low, it may contain water particles which may also cause damage to components of the steam turbine.

In these types of power plants, control of the steam temperature is often achieved by spraying saturated water into the steam fluid at a point before the final heat exchanger section, i.e., the heat exchanger section located just before the steam turbine. Various temperature sensors are provided in and between the heat exchanger sections to measure the steam temperature, and the measured steam temperature is used to determine the amount of saturated water spraying which takes place. The operation of the plant can typically be optimized, however, by controlling the fuel flow to the boiler and the spraying of the water within the heat exchanger sections in a manner that keeps the steam temperatures at the desired set points while using the minimal amount of fuel.

In any event, as noted above, thermal as well as nuclear utility plants generally implement a steam cycle in which steam is generated in a boiler or a nuclear reaction vessel and is provided to one or more steam turbines. In most cases, pipes direct the steam exiting the turbines to one or more condensers, which cool the steam, returning it to liquid form, and this liquid is then returned to and reheated in the boiler or other steam generator. Many different types of condensers can be used to cool the steam, with the most common or prevalent type of condenser being a water cooled condenser, such as that used in many once-through water cooling systems or in closed re-circulating water cooling systems. In most once-through water cooled systems, external cooling water, such as sea water, river water or lake water is pumped through a heat exchanger within the condenser. Heat from the steam is transferred to the cooling water within the heat exchanger, and the cooling water is then returned to the sea, river, lake or other source from which it was taken. In a closed re-circulating water cooling system, the cooling water exiting the condenser is pumped, for example, to an evaporation unit, where the water is cooled and is re-circulated back to the heat exchanger in the condenser.

As is known, the majority of the new or fresh water used in a power plant that uses water cooled condenser systems is used in the condenser cooling cycle. In fact, many older power plants that use once-through cooling heat large volumes of water and then return that water, with little volume loss, to a river, a lake, or an ocean. Unfortunately, water is often a limited or scarce resource, and thus may not be in sufficient supply at any particular power plant site. Many countries, such as China, are very concerned about stressing water supplies and so have limited the use of water in these types of power plants. In some regions, especially dry and arid regions, the use of lake and river water is tightly regulated, and so it may not be possible, or it may be very costly to use a large amount of fresh water in a power plant cooling system. Still further, once-through cooling systems, while consuming very little water because they return most of the water to the source, still heat up the water, which in many cases leads to undesirable environmental impacts. For example, a 2002 EPRI report found that a typical once through water cooling system at a plant burning a fossil fuel, biomass, or waste requires withdrawals of 20,000 to 50,000 gal./MWh (gallons per megawatt-hour), although it only consumes (loses) 300 gal./MWh. However, the large volume of water withdrawn by a once-through cooling system can entrain and impinge aquatic organisms, and discharges heat to surface waters which may have adverse ecological effects. As a result, most United States jurisdictions now discourage or prohibit construction of new power plants that use once-through water cooling systems.

As a result, more and more new power plants are designed to use closed-loop (re-circulating) cooling systems in which re-circulating water is used to cool the steam in the condenser and is then itself cooled using, for example, an evaporative process. However, because re-circulating cooling systems cool by evaporation in towers or cooling ponds, they consume more water than once-through cooling systems. While the actual rates of water withdrawal and consumption depend on the power generation technology and the particular environmental conditions associated with a particular plant, a typical plant using a closed-loop cooling system requires withdrawals of just 500 to 600 gal./MWh but loses 480 gal./MWh to evaporation, according to the 2002 EPRI report.

While the cost of acquiring and delivering cooling water to these types of plants can vary, this cost is not insignificant. Moreover, in re-circulating cooling systems, the cost to treat and dispose of cooling water varies much more widely, depending on the characteristics of the raw water being used. For example, surface water may be suitable for cooling with minimal treatment or may only require removal of suspended solids. While effluent from wastewater treatment plants, which is typically treated to make it suitable for discharge, is usually of fairly high quality, nutrients and bacteria may restrict the use of wastewater in a cooling system unless this water is pre-treated in the power plant. Even fresh groundwater can have high concentrations of dissolved solids that can become scale unless they are removed by pre-treatment in a closed-loop cooling system. Saline water from the ocean or coastal areas also requires treatment and/or the use of special corrosion-resistant materials to make it suitable for use in a power plant. Degraded waters from coal and oil production may be available for use in a plant cooling system, but these types of water have much greater pre-treatment requirements. For example, low pH is an issue for water pumped from spent coal mines, and the effluent of oil and gas well operations can have high levels of salts, silica, and hardness. Thus, many sources of water must be pre-treated to be used in a re-circulating water cooling system. Moreover, because re-circulating cooling water also concentrates dissolved constituents in a cooling tower or a cooling pond, this water may need to be post-treated if it is to be discharged to surface waters.

In any event, because water is becoming a scarce commodity, and the use of water in re-circulating cooling systems can be expensive, plant designers are, more and more, considering direct dry cooling systems, also called air cooled condensers. Generally speaking, direct dry cooling systems condense turbine exhaust steam inside a set of finned tubes, which are externally cooled by ambient air instead of surface water or re-circulating water. In these dry cooling systems, ambient air is circulated within the condenser to perform cooling either using a natural draft system or using electric fans.

A natural draft system uses a hyperbolic tower that can exceed, for example, 300 feet in height, with a series of heat exchangers disposed at the bottom thereof. In this system, ambient air enters the bottom periphery of the tower, passing over heat exchanger elements. The heated air naturally rises inside the tower, which causes a draft at the bottom of the tower, pulling in more cool air at the bottom of the tower. Importantly, no fans are required. However, the large size of the hyperbolic tower makes the natural draft option a niche application and this type of cooling system is typically only able to be economically used at small power plant sites.

The other, more familiar direct dry cooling design includes the use of air cooled condensers which operate using electrical motor-driven fans that drive the ambient air through the finned tube structures of the condenser. Because this type of condenser system can be used in practically any location without the attendant cost of the tower, about 90 percent of the dry-cooled power plants in the world use air cooled condensers with mechanical draft, i.e., electric fans. Moreover, these types of air cooled condensers have been used on both combined cycle plants and large fossil fuel plants.

When designed, the electrically driven air cooled condensers of a particular plant are sized according to maximum design conditions, the highest load indexes and the most severe environmental conditions (e.g., the highest temperatures) expected within or at the plant. At these conditions, all of the fans of the air cooled condensers typically need to be run to perform the necessary cooling within the condensers. However, the fans of the air cooled condensers may be controllable to some extent. For example, the fans of the air cooled condensers may be designed and installed with variable frequency drives (VFD) to enable continuously varying the speed of the fan, or these fans may be installed as fixed speed fans that can be run at two or more fixed speeds to allow for turn-down of the fans. Single speed fans do exist, however, as they create a lower installed cost, which is sometimes the only concern of the plant designer. In any event, if single speed, multiple speed or continuously variable speed fans are used within a plant, the optimum combination of fans to run in any particular situation other than the designed maximum load condition, and speed at which to run these fans to obtain the appropriate cooling within the re-circulating system is generally unknown and not easily predicted, as it involves solving for an elusive multidimensional point in the operational space of the cooling system. Moreover, changing the speed of and the number of fans running within a condenser system may change the backpressure at the steam turbine, resulting in a less than expected or designed heat rate, which is typically used as the measure of plant efficiency.

Thus, while utility plants that use electric powered air cooled condensers are designed to have enough fans to operate at full load and at the worst ambient conditions (e.g., the highest ambient temperature, worst humidity, etc.), operators generally do not have any ability to gauge how many fans to use, and at what speed to run the fans, at lower then maximum load and/or at more favorable ambient conditions. As a result, to be safe, operators tend to run all of the fans or to make a conservative guess as to how many fans to run at less than full load conditions. Unfortunately, running the electric fans of the air cooled condensers uses electric energy (created by the plant) and thus reduces the final output of the electric plant, thereby increasing the cost of the electrical power generation being performed. Standard methods of operating the air cooled condensers therefore typically result in a plant being less efficient than is possible, resulting in higher costs to run the plant for a given energy output. Combining the fact that condenser losses are among the largest controllable losses in a steam cycle utility power plant with the fact that circulating water for the condenser cooling cycle is the largest user of water at a power plant and the fact that water is often a scarce commodity, results in a need for better optimization of power plants that use air cooled condensers.

SUMMARY OF THE DISCLOSURE

An optimization and control system for a utility plant that uses fan based air cooled condensers controls the operation of the power generation system at the plant in conjunction with the operation of the air cooled condensers so as to run the power plant at a more optimum operating point, e.g., to minimize or reduce the cost of each unit of useful energy, such as each kilowatt hour, produced by the plant. The optimization and control system includes an optimizer having a numerical solver that determines values for a set of control variables that defines an optimal operating point of the plant and an expert system that oversees and modifies the control variable settings prior to providing these settings to a plant controller. The output of the expert system is provided to the plant controller which then controls the plant to run at an optimal point as defined by the optimizer. In one embodiment, a numerical solver within the optimizer uses an objective function and one or more models of plant equipment to determine the best or most optimal operating point of the plant to, for example, minimize the cost per kilowatt-hour generated by the plant or minimize the cost of the production of other useful energy such as steam energy. As part of determining the optimal plant operating point, the numerical solver may determine the number of fans to run within the air cooled condensers of the plant and/or the speed of the fans to use in the air cooled condensers in conjunction with the amount of fuel to burn in the boiler or other thermal process, the desired temperature of the steam at the input of the steam turbine, etc., all required to produce a given amount of power (load demand) at the particular environmental conditions (e.g., temperature, humidity, etc.) currently experienced at the plant. The expert system may use or modify these outputs by determining which fans to actually use at any particular time based on, for example, the availability of or the operational status of the fans, the wear of the fans and fan motors, etc. The expert engine may then provide these modified outputs to the controller, which controls the plant to operate at the optimal operating point as specified by or associated with the outputs of the optimizer.

In one embodiment, the optimizer may determine an optimal operating point using models of the plant to model and simulate the operation of the plant in response to various different sets of control inputs to determine which set of control inputs results in the best performance of the plant, as measured by the objective function. Instead or in addition, the optimizer may cause the actual controller of the plant to control the plant in different manners or using different control set points and operating parameters and then measure the effect of these different settings. The optimizer may then use that measured plant feedback to determine the optimal operation of the plant. If desired, the optimizer may store previously determined optimal operating points for various different plant power outputs, environmental conditions, etc., and may use these previously determined optimal operating points as starting places when determining a new optimal operating point for the plant in response to a change in, for example, a load demand or one or more environmental conditions, in response to degradation of plant equipment, etc.

DETAILED DESCRIPTION

Figure 1:
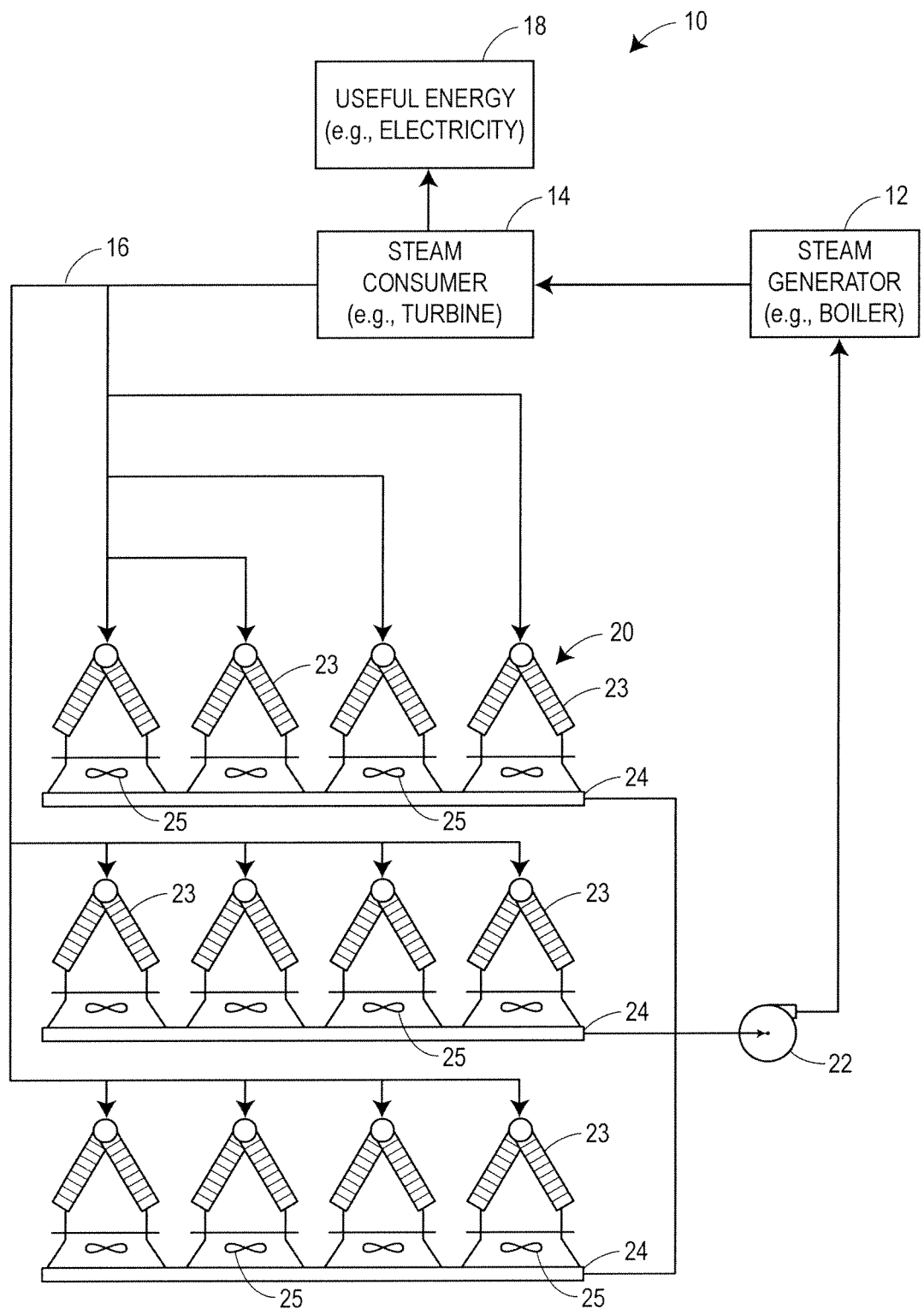
FIG. 1 illustrates a block diagram of a boiler steam cycle of an electrical power generation system that uses air cooled condensers.

Referring now to FIG. 1, a block diagram of a steam cycle of a typical energy generation system 10 includes a steam generator 12 and a steam consumer 14 (typically in the form of a steam turbine) which generates useful energy 18. The steam consumer 14 is connected within a closed re-circulating loop 16 to a set of electrical fan-operated, air cooled condensers 20. The re-circulating loop 16, which may be made of suitable pipes and ducts for carrying steam and water, also includes one or more boiler feed pumps 22 which return liquid (e.g., water) formed in the condensers 20 to the steam generator 12.

Although the steam generator 12 is described herein as a boiler system that operates using thermal principles (e.g., by burning fuel such as petroleum, waste fuel, biomass, wood chips, etc.), to turn water into steam, other types of steam generators could be used instead of or in addition to a boiler system. For example, the steam generator 12 could be a fossil fueled boiler (e.g., coal), a combined cycle heat recovery steam generator (HRSG) or even a nuclear steam generator. Moreover, while the steam consumer 14 is described herein as being a steam turbine that produces electrical power in the form of, for example, real power, reactive power, or any desired combination of the two, other types of steam consumers could be used instead to produce other types of useful energy including, for example, a process steam plant that produces process steam.

In any event, during operation, the steam generator 12 heats liquid (typically water) pumped by the boiler feed pump(s) 22 to generate steam. This steam is provided to the steam consumer 14, which in this case is a steam turbine. The steam causes the steam turbine 14 to generate electricity in any of a number of well known manners. The steam exiting the steam turbine 14 is provided through a series of pipes or ducts in the re-circulating loop 16 to one or more of a set of air cooled condenser units 20, where the steam is condensed back to liquid form. Generally speaking, the steam enters the air cooled condenser units 20 at the top of these units (as illustrated in FIG. 1), is converted back to liquid form within heat exchangers 23 in the condenser units 20, and is collected in a set of liquid collection drains, tanks or pipes 24 disposed at the bottom of the air cooled condensers 20. The boiler feed pump(s) 22 then pump this liquid back to the steam generator 12 for re-use in the steam cycle. As will be understood, each of the condenser units 20 includes an electrically powered fan 25 which draws ambient air through the heat exchangers 23 of the condenser units 20 to cool the steam flowing within the condenser units 20.

Figure 2:
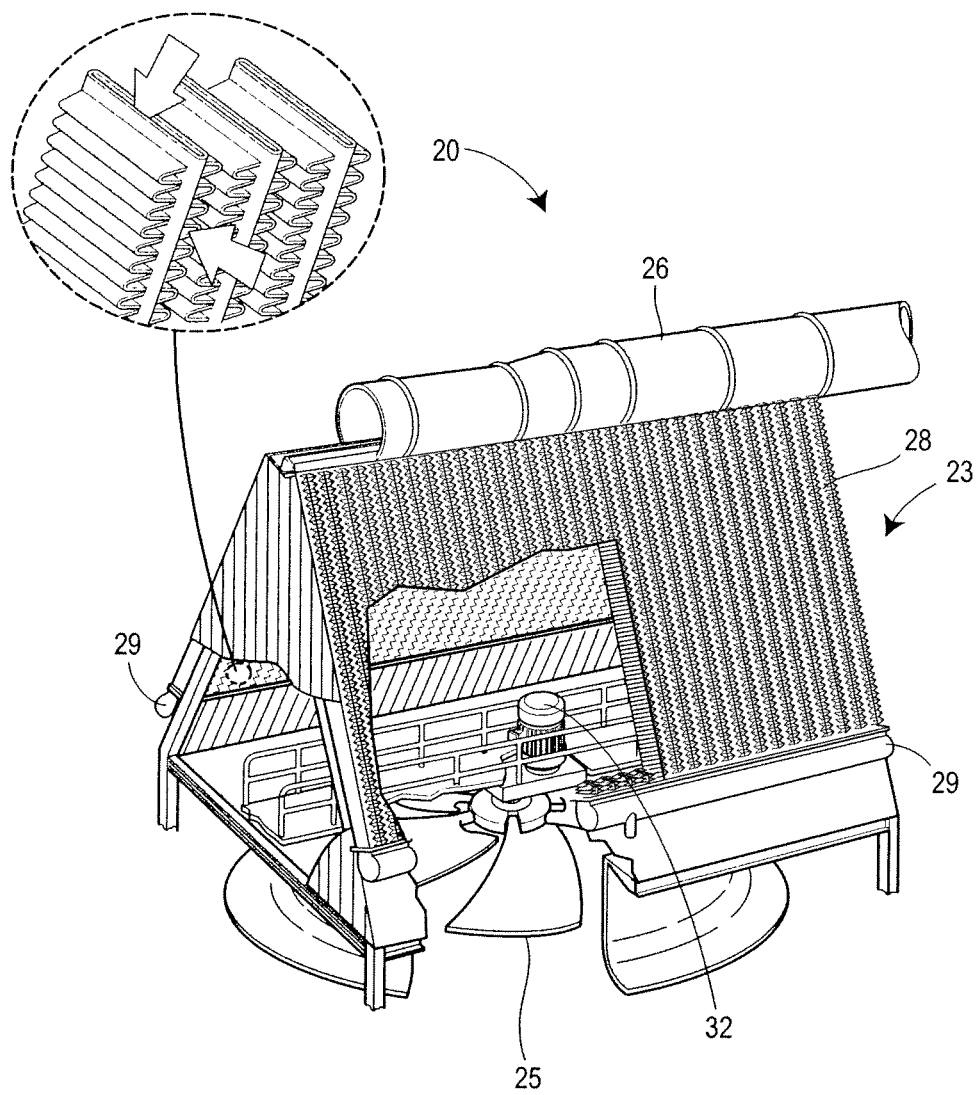
FIG. 2 illustrates an example schematic and mechanical diagram of one of the air cooled condensers used in the system of FIG. 1.

FIG. 2 illustrates an example embodiment of one of the air cooled condenser units 20 of FIG. 1 in more detail. Generally speaking, steam is delivered to the air cooled condenser unit 20 via a delivery pipe or duct 26 disposed at the top of the air cooled condenser unit 20. The pipe or duct 26 may be part of and may be connected to the re-circulating loop 16 of FIG. 1. The steam is then passed down through the heat exchanger section 23 of the air-cooled condenser 20 in a series of tubes 28 which have fins thereon. The finned, tube structures, which form the heat exchanger 23, are arranged in a generally A-shaped configuration as illustrated in FIG. 2. An expanded, cut-away view of a portion of the heat exchanger section 23 is illustrated in FIG. 2 to depict one possible heat exchanger design having tubes 28 and the fins on the tubes 28. However, the use of other tube and fin structures within the heat exchanger 23 is possible. In any event, the fins are exposed to the ambient air and form a heat sink having a large amount of surface area. The fins thereby operate to dissipate the heat within the steam traveling through the tubes 28. More particularly, as the steam flows down inside the tubes 28, the steam condenses due to the cooling effect of ambient air drawn over the external finned surfaces of the tubes 28. A fan 25, located at the bottom part of the A-shaped framework operates to draw ambient air through the heat exchanger structure 23 formed by the finned tubes 28. Condensate drains from the tubes 28 into condensate manifolds 29 and then drains to a condensate tank (not shown in FIG. 2), before being pumped back to the boiler of FIG. 1. Thus, in FIG. 2, steam enters the air-cooled condenser 20 at the top of the tubes 28, flows downward through the tubes 28 and condenses back to water within the tubes 28. The water is captured in the manifolds 29 at the base of the heat exchanger section 23, from which the water is pumped back to the boiler.

Importantly, during operation, ambient air is drawn around the tubes 28 and through the fins disposed on the tubes 28 by operation of the fan 25 powered by an electric motor 32. More particularly, the motor 32 drives or rotates the blades of the fan 25 which draw ambient air across and over the fins disposed on the tubes 28. As ambient air passes across the fins of the tubes 28, this air absorbs the heat within the fins, and thereby removes heat from the steam flowing through the tubes 28. This heat transfer operation, in turn, causes the steam to return to liquid form (e.g., water) which is collected at the bottom of the air-cooled condenser unit 20 in the one or more manifolds 29. The water then flows to a drain 24 (FIG. 1) and is pumped from back to the steam generator 12 of FIG. 1.

In many cases, the air cooled condenser 20 operates under vacuum just as a conventional surface water condenser does. Air and other non-condensable gases enter the steam from several sources, including leaks through the system boundary, and from the steam turbine. Non-condensable gases may be evacuated in a separate section of the air cooled condenser 20 called the "secondary" section, which is connected to vacuum pumps or air ejectors that exhaust the non-condensable gases to the atmosphere (not shown in FIG. 2). Generally speaking, there are basically two types of heat exchangers used in air cooled condensers such as that of FIG. 2, including single-row and multi-row heat exchangers. Each concept has its own advantages and drawbacks but the single-row design is inherently more suitable in extreme freezing ambient conditions. Generally, there are also three tube shapes available in the market including round, oval, and flat. Oval and flat tubes are the most sophisticated and perform better under just about all conditions. However, any type of tube structure and air cooled condenser design can be used. The fin shape also varies between suppliers. Some fin types are less susceptible to fouling and are mechanically more resistant in transient conditions. However, the best quality fins have a strong bond to the bare tube, which guarantees a useful life expectancy comparable to that of the power plants. Another important design factor for air cooled condensers is the material used to form the finned tubes 28. The two types of technologies that are currently recognized as being reliable for use in power plants include aluminum fins brazed on flat bare tubes and coated with aluminum, and oval galvanized finned tubes.

As will be understood, the motors 32 of the air cooled condensers 20 are driven by a controller associated with the power plant to control the operation of the condensers 20. In some cases, a valve may be disposed at the input to each of the air cooled condensers 20 to fluidly connect or disconnect the air cooled condenser units 20 to the re-circulating loop 16, to thereby enable the plant controller to use or not use a particular condenser unit 20 as desired. Alternatively or in addition, the plant controller may control the use of a particular air cooled condenser unit 20 by controlling the speed of the fan motor 32 within that unit. In some cases, the plant controller may control a particular condenser unit 20 to not be used by turning the fan motor 32 of that condenser unit 20 off, in which case the air cooled condenser unit 20 will provide no or only minimal condensing operation. In other cases, the controller may control a shut-off valve to isolate the condenser unit 20 from the re-circulating loop 16, in addition to turning the fan motor 32 of the condenser unit 20 off.

Generally speaking, the plant control system may operate the fan driven, air cooled condensers 20 so as to operate all of the condensers 20 (e.g., all of the condensers 20 shown in FIG. 1) simultaneously, or so as to operate only a subset of the total number of condensers 20 at any particular time, based on the current load demand and environmental conditions. Typically, fewer than all of the air cooled condensers 20 will be operated when the plant is operated at less than maximum design load and/or at better environmental conditions than the worst environmental conditions for which the plant was designed. The actual operation of the air cooled condensers 20 within the plant or steam cycle can be modified or controlled in a number of ways, including by controlling the speed of the fans 25 within the different air-cooled condensers 20 and/or by using fewer than all of the air cooled condensers 20 at any particular time. For example, a subset of the total number of air cooled condensers 20 can be run at a particular time so that less than all of the air cooled condensers 20 are being used. In addition or alternatively, the speed of the fan 25 of any particular condenser unit 20 may be modified or controlled to change the amount of condensing that is performed by that particular condenser unit 20. In some cases, the fans 25 of all or of a subset that is less than all of the condenser units 20 may be operated to be at the same speed, or alternatively, the fans of different ones of the air cooled condensers 20 may be operated at different speeds so that different fans of different condenser units 20 are operated differently to provide different levels of condensing. As noted above, the motors 32 of the air cooled condensers 20 may be variable frequency motors so as to be able to run at any desired speed, or these motors may be selectable to run at one or more different preset speeds. In addition to fan speed, the fan units of the air cooled condensers 20 could be controlled and/or monitored using the current and voltage on one or more of the (typically three) phases of each fan motor 32. In addition, the fans 25 can be run in reverse, which might be necessary in some special situations.

Of course, the number of air cooled condensers 20 used at any particular time, and the speed at which the fans 25 of these condensers 20 are run may be controlled to provide granularity of control of the air cooled condenser section of the steam cycle, to thereby provide different amounts of condensing under different power plant operational conditions. Generally speaking, the plant controller can provide more condensing by operating more air cooled condensers 20 and/or by increasing the speed of the fans 25 of the condenser units 20 being used at any particular time. However, while providing more condensing action, this operation also increases the electrical power consumption of the air cooled condensers 20 and thus decreases the power output of the plant for a given fuel burn.

Generally speaking, in typical water cooled thermal power generation plants, operators run the plant or set up a controller within the plant to obtain a rated heat rate or to get as close as possible to the rated heat rate, based on manufacturer or installer specifications and suggestions. As is known, heat rate is a measure of kilowatt-hour per unit fuel consumption. In these cases, the operators typically try to run the plant at various predetermined set points so as to achieve a particular steam flow and steam temperature, a particular backpressure or pressure drop across the turbine, etc., to thereby obtain operation at or as close as possible to the rated heat rate.

Because the operator is attempting to run the plant so as to meet the manufacturer or designer provided specifications, there are very few control parameters that the operator can effectively change to run the plant differently (and thus more optimally). In fact, most of the control parameters that the operator can change are typically altered together on a sliding scale in response to load demand changes, because many of these variables are closely related to and are directly dependent on one another. For example, the rate of fuel burn in the boiler is closely associated with the steam flow into the turbine, and changing one changes the other in a very predictable manner. Importantly, obtaining the best possible heat rate does not necessarily mean that the plant is running optimally, especially in air cooled power plants, because heat rate does not take into account other losses in the plant, such as auxiliary power costs. Thus, while a plant operator may alter the operation of the plant to get the best heat rate possible, this operation may still fail to minimize the cost of running the entire plant per unit of energy produced.

As will be understood therefore, plant operators, in many cases, run power plants without regard to trying to optimize the entire operation of the plant, and where optimization is performed, it is performed by changing a very limited and understandable set of variables. For example, in some water cooled systems, there may be a limited number of water feed pumps (e.g., three) that can be used to pump cooling water through the condensers of the boiler cycle. In this case, the operator may select to run one, two or all three of these pumps, but this selection is typically based solely on the current load demand. That is, if the current load is less than one-third of the rated load, the operator may choose to run one pump, while if the current load is greater than two-thirds of rated load, the operator will run all three pumps. Because there are very few parameters to manipulate, it is typically a simple matter to optimize operation of the plant, to the extent any such optimization is possible.

On the other hand, power plants that use air cooled condensers typically include a significant number of these units, each of which includes a separately controllable fan and fan motor. Moreover, in many cases, the fans of each condenser unit may be controlled to run at two or more speeds or may be variably controllable to be run at any desired speed (up to the rated speed of the fan). Because of this fact, an operator of a power plant (or other type of plant) that uses fan driven air cooled condensers has a significant number of ways to vary or alter the operation of a power plant in an attempt to optimize the operation of the plant, over the number of ways to optimize other types of plants. Moreover, because fan driven air cooled condensers typically consume much more auxiliary power than water cooled condenser systems, there is more opportunity to significantly reduce the auxiliary power costs of running a plant that uses fan driven air cooled condensers, over the opportunity available in water cooled plants, for example. In fact, it has been realized that the number of choices in running a plant that uses fan driven air cooled condensers, along with the increased opportunity to actually reduce auxiliary power costs in these plants, provides a significant opportunity to optimize the operation of a plant that uses air cooled condensers in, for example, the steam cycle of the plant. In particular, the inventors have determined that the granularity of control made possible by the number of the fans and the speed control of the fans within the air cooled condenser units of a utility plant makes for significant opportunities to reduce the cost of operating the plant, and have determined that these opportunities to reduce the cost of running the plant can be obtained with the addition of an optimizer that determines an optimal operational point of the plant associated with, for example, the least cost of operating the entire plant to produce a given load at current conditions.

More particularly, it has been determined that optimization of a plant that uses air cooled condensers may be performed by controlling the number of air cooled condensers being used and by controlling the speeds of the fans of those air cooled condensers in a manner that results in the least amount of cost per unit of power being delivered by the plant, whether or not this operation results in obtaining the rated heat rate or even the best possible heat rate within the plant. In fact, because the fans of the air cooled condenser units require a significant amount of electrical energy to run, it is possible that the condenser units may be run so as to create less than a typically desired back pressure or pressure drop across the turbines or less than the maximum possible heat rate (thereby decreasing the power generated by the turbine 14 for the same amount of fuel load), while still minimizing the cost per kilowatt/hour of electricity being generated at the plant. In particular, this optimal operation can be achieved because of the reduced energy associated with operating the air cooled condensers at less than the capacity needed to obtain the pre-set back pressure or to otherwise obtain the maximum possible heat rate. The ability to control the air cooled condenser units to perform less than the fully rated amount of condensing, or even less than the amount of condensing necessary to obtain a typically desired heat rate at the output of the turbine provides an opportunity to decrease the auxiliary power cost associated with the electrical generation at the plant. This opportunity for optimization is generally not present in different types of power generation systems, such as in water cooled condensing systems which do not use a significant amount of electrical energy in the condensing operation of the steam cycle and which do not include a significant number of controlled variables within the condenser system that enable such optimization.

Figure 3:
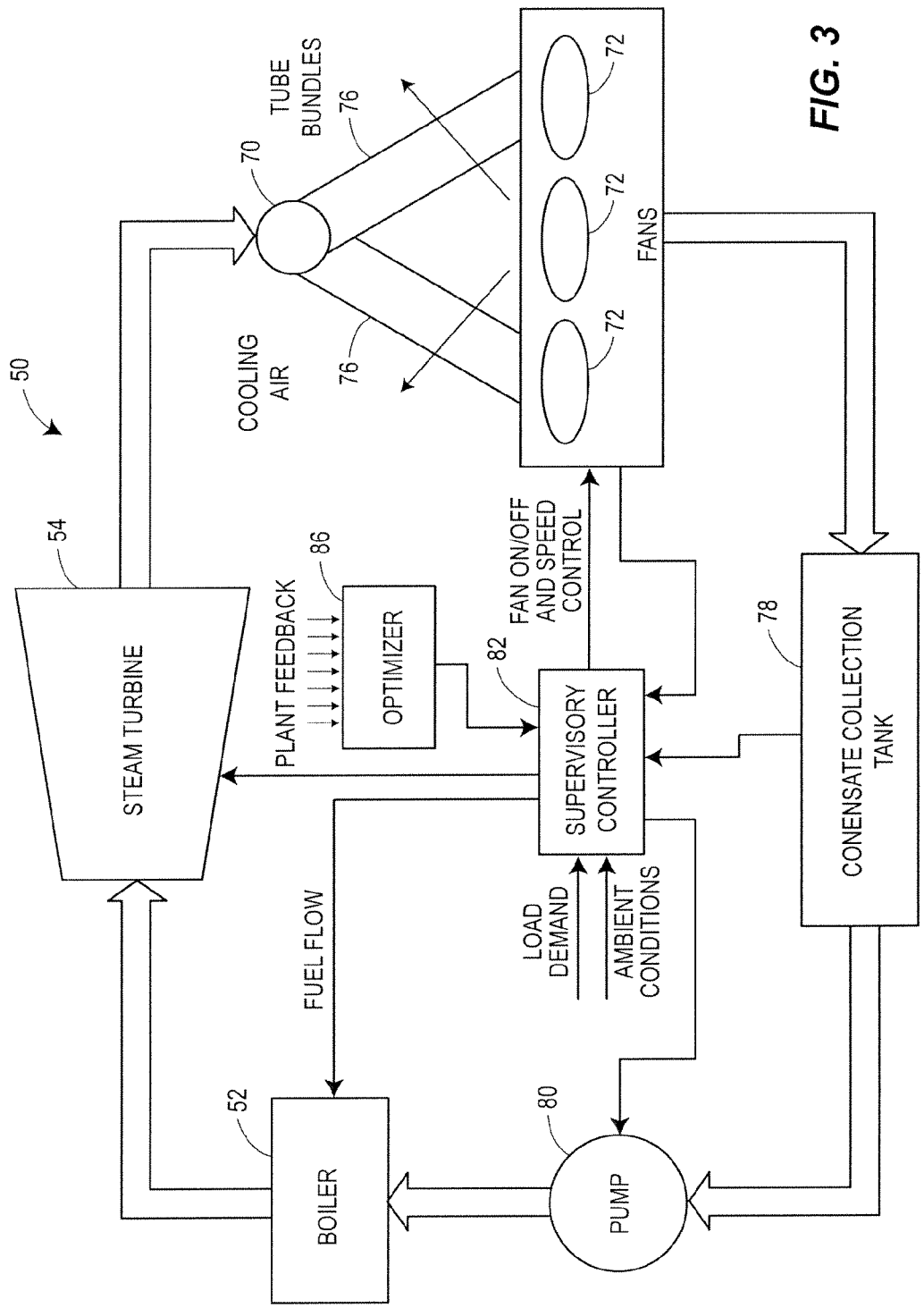
FIG. 3 illustrates a schematic diagram of the electrical power generation system such as that of FIG. 1 having components connected to a supervisory controller and an optimizer.

FIG. 3 illustrates a schematic diagram of a typical thermal utility plant 50 optimized in the manner suggested above. As shown in FIG. 3, a boiler unit 52 burns fuel to generate steam, which steam is provided to a steam turbine 54 that operates to generate electricity. The steam exits the steam turbine 54 and flows to a set of condenser units generally indicated by the reference number 70. Fans 72 associated with the condenser units 70 operate to move cooling air across tube bundles 76 within the condenser units 70, as illustrated by the arrows in FIG. 3. The steam within the tube bundles 76 returns to liquid form (i.e., water) and flows to the bottom of the air cooled condenser units 70 where it is collected in a collection tank 78. A pump 80 pumps this water back to the boiler 52 for reheating in the boiler steam cycle.

As illustrated in FIG. 3, a supervisory control unit or controller 82 is coupled to various ones of the electrical and mechanical elements within the plant 50 to perform control of the power generation plant 50. Generally speaking, the controller 82 may be a microprocessor-based controller, such as the Ovation™ controller manufactured and sold by Emerson Process Management Power and Water Solutions, Inc., a programmable logic controller (PLC) or any other type of controller typically used in a power plant to control the various different equipment within the power plant. As illustrated in the example configuration of FIG. 3, the controller 82 may receive a power or load demand signal (indicative of the power to be output by the utility plant or of the power to be output by a particular power generation unit within the utility plant) both at the present time and in the future. The controller 82 may also receive signals indicating the ambient conditions, such as the current air temperature, humidity, etc., which signals may input by a user or measured using sensors (not shown) and which signals are needed to perform proper control of the power plant in order to be able to meet the desired load demand. The controller 82 uses the demand signal and the signals indicative of the ambient conditions, as well as other inputs such as set points and feedback signals from various sensors (including temperature sensors, pressure sensors, flow-rate sensors, etc.) within the plant, to control the fuel and air mixture provided to the boiler 52, spraying within the boiler 52, etc., to thereby provide operational control of the boiler 52. The controller 82 may also control the pump 80 to control the appropriate flow of water through the boiler 52 and may control other parts of the plant 52 not specifically shown in FIG. 3, such as the sprays in the steam supply system of the plant, to control the temperature of the steam provided to the input of steam turbine 54, etc.

Importantly, however, the controller 82 is connected to and controls the operation of the fans 72 (and more specifically the fan motors of the fans 72) within the air cooled condenser unit 70 and may control which of the particular fans 72 are operated at any particular time, and the speed of those fans 72. Of course, the controller unit 82 may control some of the fans 72 to operate while leaving some of the other fans 72 off and/or may control various different fans 72 to operate at different speeds so as to perform different levels of condensing within different regions of the condenser units 70. The controller 82 may also receive feedback from the fans 72, the boiler system 52, the steam turbine 54, the pump 80, a level sensor (not shown) in the collection tank 78, as well as from any other sensors in the plant 50 to provide appropriate control of these units.

As also illustrated in FIG. 3, an optimizer unit 86 may direct the supervisory controller 82 to specify the plant operating point at which the controller 82 should keep the plant 50 or to which the controller 82 should drive the plant 50. This operating point can include any number of plant variable set points and operating parameters, including for example, the fuel burn rate to use in the boiler, the number of fans to use in the condenser units 70, the identity of the particular fans 72 to use, the speed at which to run the fans 72, and/or various other operational settings of the fans 72, such as the maximum amount of power or a range of power to be provided to operate the fans 72. The optimizer 86 may, in addition, specify other operating parameters, e.g., set points, to be achieved by the controller 82, including for example, the amount and temperature of the process steam that should be available at the input of the steam turbine 54, the back pressure to be achieved at the output of the steam turbine 54, the pressure drop across the turbine 54, the temperature of the water being fed to the boiler 52, etc. Generally speaking, the optimizer 86 will establish a set of operational target values, set points and/or ranges to be used by the controller 82 to control the operation of the power generation unit 50, so as to produce a given or a desired amount of power (load) at the least amount of cost, e.g., in a manner that provides the necessary electrical output of the plant 50 at the least overall cost. As part of this process, the optimizer 86 may provide various set points and operational control settings to the controller 82. The optimizer 86 may determine these settings based on calculations performed within the optimizer 86 identifying the optimal operating point of the power plant 50. Typically, the optimal operation of the power plant 52 will be defined as achieving the desired power output level of the plant at the least cost or, in other words, as the plant operational point that achieves the load demand within the constraints of the plant 50 at the least unit cost per kilowatt hour delivered to the power grid. Of course, different optimal operating points or targets (which result in lower or the lowest cost of operation per kilowatt hour produced by the plant) will be calculated for different power load demands and ambient environmental conditions, as well as based on various different factors within the plant 50, such as various ones of the fans 72 being out of commission, degradation of equipment in the plant 50, etc.

More particularly, the optimizer 86 may provide target set points or operational parameters to be met by the controller 82 to achieve the most optimal operation of the power plant 50 taking into account the costs associated with running the plant 50, including the main costs (such as the cost of the fuel being used) as well as auxiliary costs (such as the cost of running the air cooled condensers 70). The optimizer 86 may, for example, instruct the controller 82 to run a particular number of fans 72 within the condenser unit 70 that is fewer than all of the fans 72, and/or may specify the speeds at which to run the fans 72. Interestingly, the optimal operating point of the plant 50 may be associated with obtaining what is typically considered to be sub-optimal back pressure at the output of the steam turbine 54 because such sub-optimal back pressure prevents the turbine 54 from obtaining the desired or rated heat rate, thereby leading to what would normally be considered to be the sub-optimal generation of power in the steam turbine 54. However, the optimizer 86 may force this type of operation because it determines that the amount of energy used by the fans 72 to obtain the desired back pressure at the turbine 54 output would increase the overall cost of producing the energy output by the steam turbines 54 (because of increased auxiliary power costs) over that associated with running the plant 50 at what would previously be considered to be a sub-optimal operating point. In other words, simply running the plant 50 to obtain a desired or minimum possible heat rate or a desired back pressure at the output of the steam turbine 54 may not result in the most optimal operation of the plant because of the costs associated with running the fans 72 of the air cooled condensers 70.

Moreover, the optimizer 86 may determine an optimal operating point of the power plant 50 taking into account various operational conditions that might currently exist in the plant 50, such as the existence of faulty devices which are under repair and which thus cannot be used (including, for example, one or more of the fans 72), making sure that the plant 50 operates in a manner that does not lead to damage of the plant equipment (e.g., keeping a certain number of fans on, so as to prevent freezing of water within the tube bundles 76 under certain ambient conditions), etc.

Figure 4:
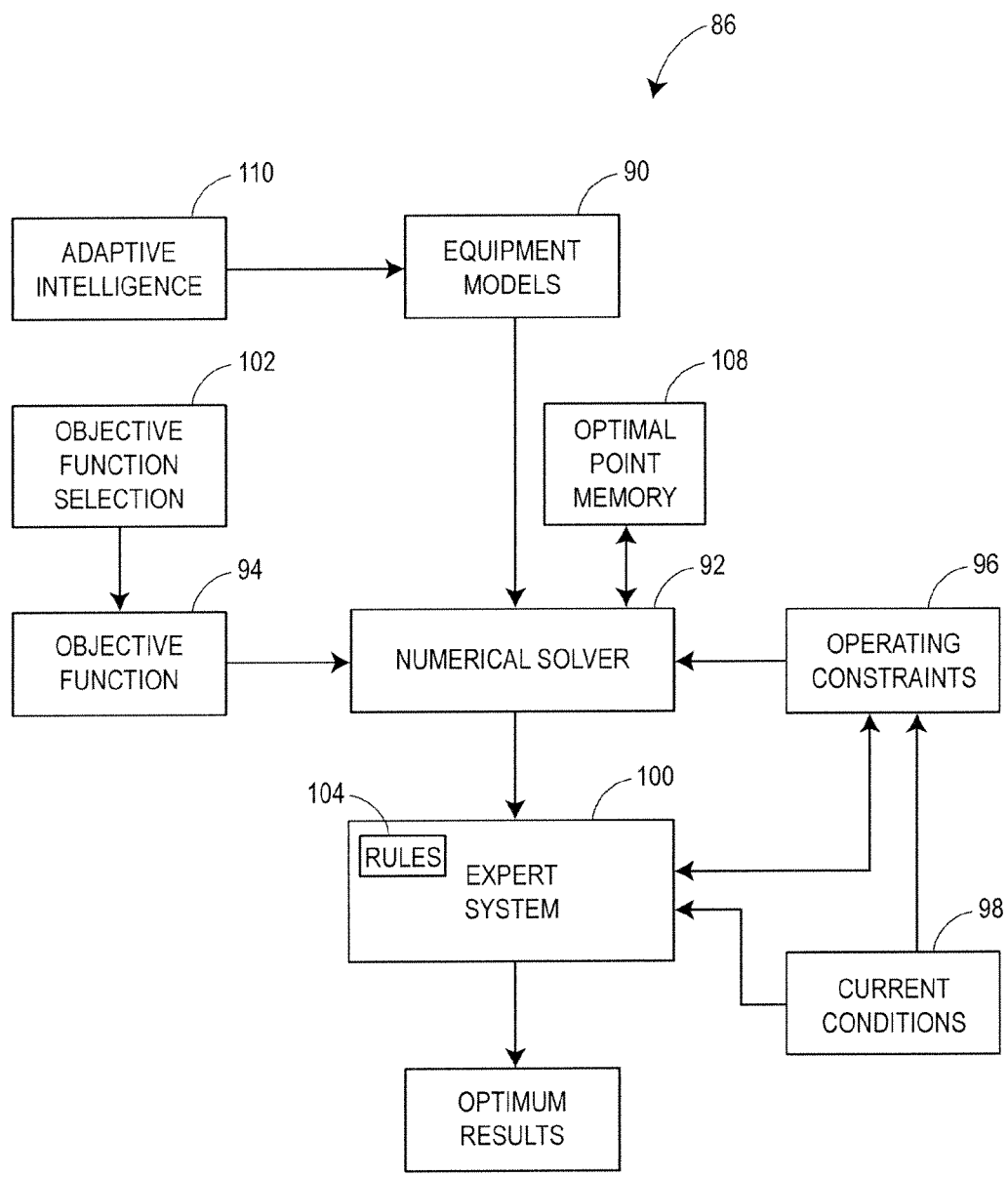
FIG. 4 illustrates a block diagram of the optimizer of FIG. 3.

One possible configuration of the optimizer 86 is illustrated in detail in FIG. 4. Here, the optimizer 86 includes a set of equipment models 90 which model the plant 50, parts of the plant and/or particular plant equipment, and a numerical solver 92 which uses the equipment models 90 to determine an optimal operating point of the utility or power plant 50. Generally speaking, the equipment models 90 allow the numerical solver 92 of the optimizer 86 to predict or estimate the operation of the plant 50, or a portion of the plant such as the boiler section, the steam cycle, etc., in response to various different control inputs or at various different plant operating points. The equipment models 90 can include separate models for different pieces of plant equipment or aggregate models of equipment, and the models 90 can be component models, unit models, and/or loop models which model the reaction or operation of one or more individual pieces or groups of equipment within the plant 50. The models 90 can be any suitable type of mathematical models, including immunological based models, neural network based models, statistical models, regression models, model predictive models, first order principle models, linear or non-linear models, etc.

As also illustrated in FIG. 4, the numerical solver 92 uses a stored objective function 94 to determine which of various different possible operating points of the plant 50 is optimal based on current conditions within the plant, constraints associated with the plant and the models 90 of the plant. The numerical solver 92 also receives a set of operating constraints 96 which specify different constraints or limits within which the numerical solver 92 must operate (e.g., limits or constraints which the numerical solver 92 cannot violate when determining an optimal plant operating point based on the objective function 94). These constraints may include any limits, ranges, or preferred operating points associated with any equipment or process variables within the plant and can be specified by a user, an operator, a plant designer or an expert engine as described in more detail below. These constraints may include, for example, limits or ranges associated with water levels within the plant 50, steam and water temperatures, steam pressures, fuel flow, steam flow, water flow, and other operating ranges or set points to be used in the plant 50. The constraints 96 may also specify or identify particular equipment which may be available or not available at any particular time to be used in the plant 50. For example, different ones of the fans or air condenser units 70 of FIG. 3 may not be available for use at a particular time, because these units may be out of service, may be under repair, etc. In this case, the constraints 96 may include or be in the form of a maintenance schedule specifying when particular pieces of plant equipment are being serviced, repaired or otherwise planned to be out of commission, thereby specifying when these units can and can not be used. Moreover, the constraints 96 may include an indication of which units or equipment within the plant 50 are in or are out of service and the allowable operating ranges or parameters of equipment within the plant 50.

Some of the operating constraints 96 may be indicative of or effected by current conditions 98 in the plant and the current conditions 98 are provided as operating constraints to the numerical solver 92. These current plant conditions 98, which may be measured or sensed in the plant or may be input by a user or operator, may include, for example, the current load demand on the plant or a portion of the plant (e.g., the power or other load to be produced by the plant 50 or a particular turbine 54 within the plant 50), the ambient temperature, the relevant ambient humidity, forecasts of load demand and environmental conditions for the future, etc. In some cases, the load demand can be specified as either or both of the real power (Megawatts) and reactive power (MVAR) to be delivered by the plant 50 or a section of the plant 50. However, if desired, the load demand could be specified as other types of loads, such as turbine power demand or, in some instances a process steam demand (e.g., in situations in which the boiler 52 is being run to produce a particular amount of process steam needed in a process).

Generally speaking, during operation, the numerical solver 92 uses the equipment models 90 to simulate or model the operation of the plant 50 at various different operating points while operating under the current environmental conditions 98 and within the current constraints 96. The numerical solver 92 then calculates or solves the objective function 94 for each of these operating points to determine which operating point is most "optimal" by minimizing (or maximizing) the objective function 94. The specifics of the operating point (e.g., set points, fuel burn rates, number and speed of the fans 72 to run, etc.) associated with the optimal operating point are then provided to an expert system 100. Of course, the numerical solver 92 may perform the optimization calculations for the current time and for any number of times in the future, to thereby provide a trajectory of operating points to be reached in view of known future changes in the load demand, expected environmental condition changes, maintenance activities which will take plant equipment off line or put plant equipment back on line, etc.

While the objective function 94 can be any type or desired function defining a method for determining an optimal operating point of the plant 50, in a typical situation, the objective function 94 will determine an achievable operational point of the plant 50 that satisfies the current load demand of the plant 50 at the current environmental conditions 98, at the least or minimal dollar-per kilowatt-hour operating cost, taking into account all or most of the variable costs in running the plant 50. These variable costs may include, for example, the cost of the fuel needed in the boiler 52, the cost of running the pumps 80 within the re-circulating system of the plant 50, the cost of running the fans 72 of the air cooled condensers 70 of the plant 50, etc. During the optimization calculations, the numerical solver 92 may model or simulate the operation of the plant 50 (using the equipment models 90) to determine the optimal fuel and air mixture or burn rate, the optimal speed of the re-circulating pumps 80, and the optimal usage of the fans 72 within the air cooled condensers by determining the particular combination of these and other process variables that minimizes or reduces the objective function 94 while still obtaining the desired load. Of course, the numerical solver 92 may determine an "optimal operating point" by modeling various different combinations of the relevant process or plant variables using, for example, an iterative process, and computing the objective function 94 for each modeled combination to determine which combination (or operating point) results in minimizing (or maximizing) the objective function 94 while still allowing plant operation that meets the load demand at the relevant environmental conditions 98 without violating any of the operating constraints 96. Thus, the numerical solver 92 may select a fuel burn rate or fuel/air mixture to achieve a desired power output at the current environmental conditions 98 and determine the minimal number of fans 72 or the combination of the speeds of the fans 72 (as well as determining other relevant plant operating variables values) that result in the minimal usage of auxiliary power, while still allowing the plant 50 to generate the load demand at the current environmental conditions 98 without violating any of the operating constraints 96. The numerical solver 92 may then apply the objective function 94 to this operating point to determine an objective function value for this operating point. The numerical solver 92 may then change the fuel burn rate by, for example, increasing or decreasing this rate, and again determining the minimal number or speed of the fans to use to obtain the desired load under the current environmental 98 and operating constraints 96. The numerical solver 92 may then apply the objective function 94 to this operating point and determine the objective function value for this operating point. The numerical solver 92 may continue to make changes to the modeled operating points by, for example, iteratively varying the fuel burn, fuel/air mixture, the number of fans 72 used in the air cooled condensers 70, the speed of the fans 72, the electrical power provided to the fans 72, etc. and evaluating each of these operating points using the objective function 94 to determine which operating point results in the minimum (or maximum) objective function value. The numerical solver 92 may select the operating point that minimizes or maximizes the objective function 94 as the optimal operating point for delivery to the expert system 100. Here it will be noted that the numerical solver 92 may use any desired routine, such as an iterative routine, to select various different operating points for simulation for possible use as an actual optimal plant operating point. The numerical solver 92 may, for example, use the results of previous simulations to direct the manner in which various variables are changed to select new operating points. In most cases, however, the numerical solver 92 will not model or consider every possible plant operating point because the multi-dimensional space created by the number of process variables that can be changed results in too many potential operating points to be practically considered or tested. Thus, selecting an optimal operating point, as used in this discussion, includes selecting a local optimal operating point (e.g., one that is optimal in a local region of operating points of the plant 50), and includes selecting one of a set of simulated operating points that minimizes or maximizes the objective function 94 without regard to non-considered operating points. In other words, selecting or determining an optimal operating point as used herein is not limited to selecting the operating point which minimizes or maximizes the objective function 94 across the entire multi-dimensional operating space of the plant, although in some cases this may be possible.

As will be understood, the numerical solver 92 may determine that the optimal operating point of the plant 50 as calculated by the objective function 94, requires a trade-off between adjusting the heat rate being used in the plant and the auxiliary power costs (e.g., the costs of running the fans 72 of the air cooled condensers 70) necessary to obtain that heat rate, thereby running the plant 50 at an operating point that does not obtain the best heat rate obtainable with the current plant technology. This operation results in the operation of the plant 50 that varies significantly from the manner in which plants are currently run or "optimized," as the methodologies currently used to obtain "optimal" performance in process plants is to run the boiler system to produce a desired or preset heat rate without regard to auxiliary costs.

If desired, the numerical solver 92 may implement a least-squares technique, a linear programming (LP) technique, a regression technique, a mixed integer linear programming technique, a mixed integer non-linear programming technique or any other known type of analysis to find the achievable operating point of the plant 50 that minimizes (or maximizes) the objective function 94, given the current conditions 98, the constraints 96 and the load requirement information provided to the numerical solver 92. In one example, the numerical solver 92 is a linear programming (LP) optimizer that uses the objective function 94 (which may be provided from a selection block 102) to perform process optimization. Alternatively, the numerical solver 92 could be a quadratic programming optimizer which is an optimizer with a linear model and a quadratic objective function. Generally speaking, the objective function 94 will specify costs or profits associated with each of a number of manipulated variables (which are referred to generally as process or plant variables) and the numerical solver 92 determines target values for those variables by finding a set of plant variable values that maximize or minimize the objective function 94 while operating within the constraints 96. The selection block 102 may store a set of different possible objective functions (each of which mathematically represents a different manner of defining the "optimal" operation of the plant 50) for potential use as the objective function 94, and may provide one of the stored objective functions to be used as the objective function 94 used in the numerical solver 92 based on, for example, user input. For example, one of the pre-stored objective functions in the block 102 may be configured to reduce the cost of operating the plant 50, another one of the pre-stored objective functions may be configured to minimize the creation of undesirable pollutants or gases within the plant 50 while a still further one of the pre-stored objective functions in the block 102 may be configured to maximize the steam produced by the plant 50.

A user or an operator may select one of the objective functions in the block 102 by providing an indication of the objective function to be used on an operator or user terminal (not shown), which selection is then provided to the selection block 102. In response to the input, the selection block 102 provides the selected objective function to the block 94. Of course, the user or operator can change the objective function 94 being used during operation of the utility plant 50. If desired, a default objective function may be used in cases in which the user does not provide or select an objective function.

As noted a above, during operation, the numerical solver 92 may use a linear programming (LP) technique to perform optimization. As is known, linear programming is a mathematical technique for solving a set of linear equations and inequalities that maximizes or minimizes the objective function 94. Of course, the objective function 94 may express economic values like cost or profit but may express other objectives instead of or in addition to economic objectives. Using any known or standard LP algorithm or technique, the numerical solver 92 generally iterates to determine a set of target manipulated plant variables which maximize or minimize the selected objective function 94 while resulting, if possible, in plant operation that meets or falls within the constraints and while producing the required or desired load, output power, process steam, etc.

Once the numerical solver 92 determines an optimal operating point of the plant 50, the expert system 100 can assess the feasibility of this operating point from a safety and implementation standpoint and may modify this solution or further define this solution if needed based on a set of rules 104 stored in or as part of the expert system 100. In some cases, the expert system 100 may store rules 104 that examine the solution provided by the numerical solver 92 to make sure implementation of this solution does not result in an unsafe condition, either for humans in or around the plant 50 or for equipment within the plant 50. The expert engine 100 may also store rules 104 that help the expert engine 100 to specify particular equipment to use to implement the solution provided by the numerical solver 92. For example, the expert engine 100 may specify which particular fans 72 or condenser units 70 to use to run at a particular time to implement the solution specified by the numerical solver 92. The expert engine 100 may, for example, determine which fans 72 or condenser units 70 to use based on which of these units are in service at the particular time (thus preventing the controller of FIG. 3 from trying to use a fan 72 or to control a fan 72 of a condenser unit 70 that is being serviced or that is out of commission). The expert engine 100 may also specify the use of particular fans 72 of the condenser units 70 to prevent excessive wear on or overuse of one or more fans 72 to thereby extend the life of the fans 72. Thus, the expert engine 100 may, over time, try to average out which fans 72 are being used to thereby prevent one fan 72 from sitting idle all of the time (which is not good for the fan motor) and/or another fan 72 from being used all of the time (which is also not good for the fan motor). In this case, the expert engine 100 may prevent the numerical solver 92 from using the best condenser unit 70 (i.e., the most efficient condenser unit) all of the time, which would result in overuse of that condenser unit 70, while also assuring that the worst condenser unit 70 (i.e., the least efficient condenser unit 70) is run at some minimum level or frequency. The expert engine 100 may also track usage of the plant equipment and track the scheduled service for the plant equipment, and may force the controller 82 of FIG. 3 to use particular equipment which is scheduled to be serviced in the near future at a heavier load so as to maximize the usage of that equipment prior to the servicing or repair activity.

Additionally, the expert engine 100 may force additional conditions on the plant 50 not considered by the numerical solver 92. For example, in some cases, the expert engine 100 may cause some or all of the fans 72 of the air cooled condensers 70 to run at a minimal level or at various levels to prevent freezing of the water within the air cooled condensers 70 (e.g., when freezing weather is present at the plant 50), even though the numerical solver 92 specifies that, for example, only one half of the condensers 70 need to be used in the optimal solution.

In addition to modifying the outputs of the numerical solver 92, the expert engine 100 may add or specify constraints 96 to be considered by the numerical solver 92 in determining an optimal operating point of the plant 50. For example, the expert engine 100 may specify a reduced number of fans 72 or condenser units 70 that can be used in any solution provided by the numerical solver 92 because the expert engine 100 knows that a certain number of these units are out of order or are being serviced, to preserve the life of particular fans 72 which have been heavily used for a period of time, etc. In the same manner, the expert engine 100 may limit the speed at which one or more fans 72 can be run in certain circumstances, may specify a minimum speed at which the fans 72 need to be run, etc. Of course, the expert engine 100 can provide and modify any number of different constraints 96 to be used by the numerical solver 92, so as to direct the solution provided by the numerical solver 92 to meet criteria or initiatives that are being implemented by the expert engine 100 or by the rules 104 of the expert engine 100, such as preserving the life of the plant equipment, enabling maintenance and repair of the plant equipment while the plant 50 is running, etc.

In one case, the numerical solver 92 may determine and use a desired cooling water return temperature or a desired condenser back-pressure that the plant 50 needs to maintain for a certain output. In this case, the numerical solver 92 may determine the speed of the fans 72 or number of pumps 80 to turn on to keep the plant 50 running close to those targets. In many cases, it may be possible to determine or define performance calculations that can be executed to know when the optimum configuration is achieved. In this case, various equipment combinations can be tried until an optimum is found. This method may require collecting a lot of plant data at different ambient conditions and/or load demands, correlating the results and then storing those results for later use.

In another embodiment, the expert system 100 can steer the numerical solver 92 by specifying a target number of air cooled condenser cells or a range of condenser cells to use or to consider using in determining an optimal operating point. In this case, the expert engine 100 could constrain the numerical solver 94 to use, for example, eight plus or minus two condenser units 70 out of the total number of such units available. As another example, the expert engine 100 may specify a target auxiliary power budget or power range for the condenser units 70 (such as 5000±250 kW) to limit the solution determined by the numerical solver 92 in this manner. This targeting (steering) can be accomplished by providing these ranges as constraints 96 to be used by the numerical solver 92 during operation via the constraint block 96. In another case, the numerical solver 92 can run unconstrained in these regards but can produce a range of operational variable values that can be used in operation and the expert engine 100 can select operating points within these ranges based on the rules 104 of the expert engine 100. For example, the numerical solver 92 could specify the optimal operating point as being in a range of values, such as specifying the use of eight plus or minus two condenser units 70 or alternatively using an auxiliary power budget of 5000±250 kW. The expert engine 100 could then specify a more particular value to use in the operation of the plant based on the rules 104 or other information available to the expert engine 100 and/or could specify which particular condenser units 70 to use at any particular time. Of course, the interaction between the numerical solver 92 and the expert engine 100 could be implemented in both of these manners so that these units work together to determine an optimal or near optimal operating point of the plant based on the objective function 94, while still satisfying the objectives trying to be implemented by the rules 104 within the expert engine 100.

In one case, the expert engine 100 could use the future forecast of load demand, environmental conditions, service conditions, etc. to choose a specific value within the range of values provided by the numerical solver 92. For example, if the expert engine 100 knows that load will be decreasing in the future, the expert engine 100 may select a value towards the lower end of the range specified by the numerical solver 92. On the other hand, if the expert engine 100 knows that the load will be increasing, the expert engine 100 may select a value towards the higher end of the range output by the numerical solver 92.

In any event, the expert engine 100 provides the modified (if necessary) set points, and other plant variable values such as which fans 72 to use, the speed of the fans 72, the fuel burn level, and any other plant variable target values to be used by the plant controller 82 to control the plant 50 to run at the optimal operating point determined by the numerical solver 92 (and modified by the expert engine 100).

Still further, during operation, the numerical solver 92 and/or the expert engine 100 may store solutions determined for past runs of the optimizer 86, along with the pertinent characteristics associated with or that went into forming those solutions, such as the ambient conditions, load demand, constraints, etc., in a memory 108. Thereafter, when solving the objective function 94 or otherwise running within the optimizer 86 to determine a new optimal operational point, the numerical solver 92 may determine one or more of the stored previous solutions which have a similar or which have the closest set of conditions, and start with that solution (e.g., first try that solution) as the potential optimal operating point of the plant for the current set of conditions, constraints, etc. This feature assists the numerical solver 92 in quickly narrowing in on an optimal solution, enabling the numerical solver 92 to operate faster because it starts iterating from a point that has been previously determined to be optimal for a similar set of conditions, constraints, load demand, etc. In particular, while the new optimal solution may not be the same as a previously stored solution due to changes in the plant equipment, differences in conditions, constraints, etc., the new solution may be relatively close to a stored solution (in a multi-dimensional space), enabling the numerical solver 92 to find the new optimal solution more quickly through the iterative method it applies in testing different plant operational points to determine an new optimal operational point.

Additionally, an adaptive intelligence block 110 illustrated in FIG. 4 performs adaptation of the equipment models 90 based on measured or user feedback about conditions in the plant 50. More particularly, the adaptive intelligence block 110 may receive measurements indicating the operational status of various different pieces of equipment within the plant 50 to detect changes in performance of the equipment, due, for example, to degradation and age of the equipment, repairs made to the equipment, etc. Of course, a user may input plant operating data, mechanical conditions that affect the operation of the plant equipment or may specify other information about the plant equipment used by the plant models 90. Alternatively or additionally, the adaptive intelligence block 110 may measure the actual performance of the plant 50 or of equipment in the plant 50 after performing an optimization routine and compare that performance to the performance modeled by or expected in light of the equipment models 90, and may then change the equipment models 90 to more accurately reflect the current or measured operation of the plant equipment. Of course, the adaptive intelligence block 110 may measure and adapt the models 90 at an equipment level, a unit level, a loop level, etc. As will be understood, the equipment models 90 may be changed to reflect changes in heat transfer capacity of various components of the plant 50, including the boiler 52, the air cooled condensers 70, etc. Moreover, the adaptive intelligence block 110 may measure or estimate the actual heat transfer capacity of the individual condenser units 70 are of all of the units 70 as a whole, (including, for example, the efficiency of the fans 72 in the condenser units 70) and may change the models 90 of these units to reflect the measured or determined changes in operation or efficiency of these units.

As will be understood, any optimization performed by the optimizer 86 will include trade-offs and will be based on the constraints and limits that reduce the possible range of solutions (i.e., operating points of the plant 50). Besides the load demand and physical limits of the hardware, these constraints include practical considerations, such as equipment not being available or equipment being set in manual mode and equipment that must be run due to other operating concerns (e.g., preventing freezing of the equipment, etc.) In the optimization design disclosed above, different approaches taken by the plant designers will also limit the possible solutions. For example, if a plant is designed with a number of full speed electric fans for the air cooled condensers 70, no fan 72 can be run at lower speed, so the optimization performed by the numerical solver 92 with respect to the optimal use of the fans 72 becomes a binary search of trade-offs between extra electric power to run an additional fan 72 and the added benefit of condenser back pressure obtained as a result of the use of that fan 72. However, even this simplified opportunity can benefit from the optimization approach described above because the model based component of this approach can learn the current conditions, compare it to previously stored near optimums and move the process to this starting point. After moving towards this starting point, considering other constraints as mentioned above, the optimization process can refine the operational choices to achieve an operating point that better meets the objective function 94. Moreover, this optimization approach accounts for and allows the implementation of expert rules 104 with override conditions. As noted above, such rules 104 may include, for example, that every fan must run for a minimum and maximum amount of time for every so many megawatt-hours of produced electric power to extend the life of the fan 72, to prevent freezing in the condenser unit 70, etc.

In fact, combining the expert system 100 with model based optimization implemented by the numerical solver 92 allows the optimizer 86 to learn over time and to be easily constrained by operational practices. This approach also enables novel air cooled condenser heat transfer patterns and constraints that were not apparent during the design phase of the plant to be determined over time so that, over all, best practices for operation can be determined and realized, even after the plant 50 has been constructed. Of course, alternative applications of model based learning can include monitoring of heat transfer and performance degradation in the various areas of the plant 50. In this case, the plant 50 might require additional field devices (e.g., sensors) for determining intermediate temperature measurements and other measurements needed to make these performance determinations. However, the additional data can be exploited to determine under performing equipment or other potential health issues (e.g., certain areas might need to be cleaned for example) associated with the air cooled condensers 70. Freeze protection is also a significant mode to protect from tube damage.

Moreover, the temperature of the ambient air and the moisture in the ambient air will affect the cooling performance of the air cooled condensers. Therefore, increasing the moisture content of the air and cooling the air will increase performance, allowing fewer fans 72 to run, resulting in less auxiliary power costs. Such an advantage may be accomplished by providing the plant with an inlet "fogger" such as those used to condition the air for a combustion turbine to put moisture into the air flowing through the condenser units 70. In this case, the level of use of the fogger units may be included in the optimal operating point delivered by the optimizer 86 to the plant controller 82.

Figure 5:
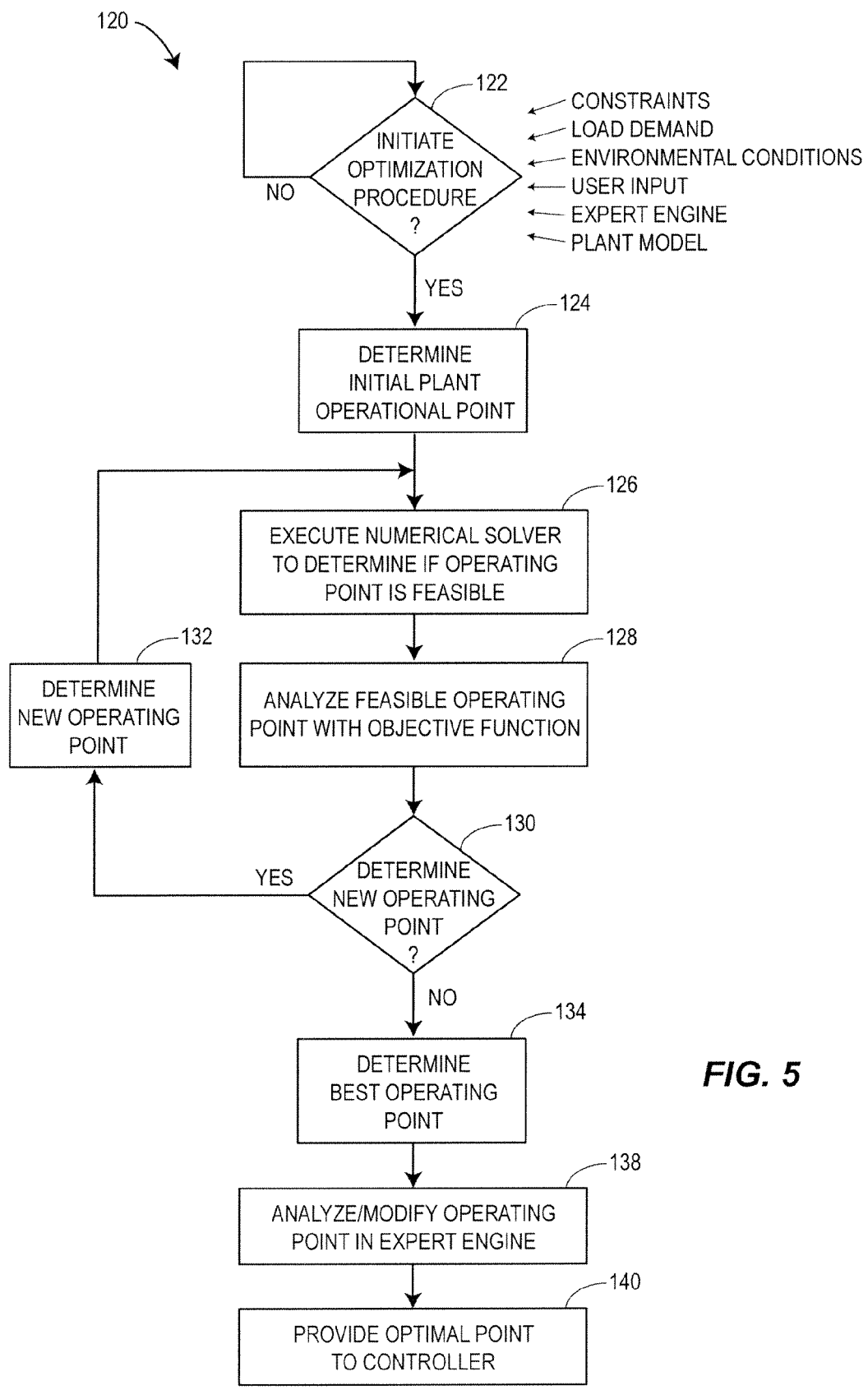
FIG. 5 illustrates a flowchart of the operation of the an optimization cycle implemented by the optimizer of FIG. 4.

FIG. 5 illustrates a flow chart 120 illustrating one possible operational cycle of the optimizer 86 of FIG. 4. Generally speaking, the optimizer 86 may operate or perform an operational cycle in response to a change in the load demand, a change in the environmental conditions 98 or even a change in one or more of the operational constraints 96 (which may result from user input, independent action by the expert engine 100, changes in plant equipment status, changes in one or more of the equipment models 90 performed by, for example, by the intelligence block 110, etc.) Thus, a block 122 within the routine 120 determines a change in the system that may require a new optimization procedure, including a change in one of the constraints 96, environmental conditions 98, load demand, a user input requesting a new optimization cycle, etc. As noted above, the expert system 100 can also initiate a new optimization procedure directly, by sending a signal to the block 122 to initiate a procedure, or by changing one or more of the constraints 96 based on new information the expert system 100 might have. If no change is detected, the block 122 continues to check for changes until a change is detected. Alternatively, the block 122 may initiate a new optimization procedure after a predetermined time period or may cause the optimizer 86 to run constantly as a background procedure.

In any event, when a new optimization procedure is initiated, a block 124 determines a starting or initial operating point to use as a possible plant operating point in light of the new situation (e.g., the new set of constraints, load demand, environmental conditions, etc.). In one case, the block 124 may access the optimal point memory 108 of FIG. 4 and locate one or more previously determined optimal points (determined for different sets of constraints, load demands, etc.) and use one of those points as a starting operating point for the current optimization procedure. Here, the block 124 may determine which of the stored optimal points was determined for a load demand, environmental conditions, etc. closest to the current situation. In another case, the block 124 may determine a plurality of previously determined points (e.g., two or more) and interpolate between these points based on differences between the load demand, constraints, environmental conditions, etc. of the stored points and those for the current situation to determine a starting plant operating point.

After choosing a starting operating point based on this determination, which starting operating point may be a weighted sum of various different stored points or an interpolation between operating points stored in the memory 108, the block 124 provides the starting operating point to a numerical solver routine.

A block 126 executes the numerical solver routine 92 to model the operation of the plant, using the plant and equipment models 90 and the plant variables or set points and conditions associated with the operating point being examined. The numerical solver routine 92 may change or adjust plant control variables to, for example, obtain a modeled operation of the plant that meets the required load demand at the relevant environmental conditions. Generally speaking, the numerical solver 92 determines if the operating point being examined is feasible, in that the plant can be operated to produce the desired load demand under the relevant conditions and constraints. When an operating point has been determined that actually meets load demand at the relevant environmental conditions 98 without violating any of the constraints 96, a block 128 applies the objective function 94 to the operating point to determine an objective function value associated with the operating point. This operating point and its associated objective function value may then be stored in a memory.

A block 130 then determines if a new operating point should be determined by, for example, determining if any of the stored operating points has an objective function value below a certain threshold, if a certain number of operating points have already been analyzed, if the change in the objective function value for the last two or more analyzed operating points is below a particular threshold, if a local objective function value minimum has been reached, or using any other desired criteria. If a new operating point is to be determined, a block 132 varies one or more of the plant variables, set points, operational conditions, etc. associated with one of the previously analyzed operating points to determine a new plant operating point to be analyzed. Generally speaking, the block 132 may change the number of condenser units (of those currently available) to use, the amount of auxiliary power to be used to run the condenser units, pumps, etc., the speed of one or more fans in the condenser units, spraying to be used in the condenser, etc. The block 132 may moreover vary the one or more plant variables or set points to determine a new plant operating point to be analyzed based on the results of the objective function analyses of previously analyzed operating points (so as to iteratively move or change plant variables in a direction that minimizes, for example, the objective function) or in any other desired manner.

When the block 132 determines a new operating point to be analyzed, this point is provided to the block 126 which then models the operation of this point to determine if this operating point is feasible, i.e., operates to meet the load demand at the relevant environmental conditions within the relevant constraints. The block 126 may vary some of the plant operating parameters, such as fuel flow, etc. to cause the operating point to meet the load demand, if necessary. If the block 126 is able to determine a feasible point (i.e., one that causes plant operation at the desired load demand within the constraints), this point is provided to the block 128 for analysis by the objective function. On the other hand, if the block 126 determines that the proposed operating point is not a feasible solution because it does not obtain the required load demand at the current environmental conditions and within the relevant constraints, the point is marked as not being feasible. In any event, any feasible operating point examined or developed by the block 126 is provided to the block 128 to be analyzed by the objective function and this information is stored. This iterative process of identifying new operating points, analyzing these operating points for feasibility and determining an objective function value for each feasible operating point is repeated for any number of iterations or points.

At some point, however, a block 134 analyzes the stored operating points and selects the operating point with the minimum (or in some cases maximum) objective function value as the optimal plant operating point. This determination may be made when, for example, a local maximum or minimum has been reached, a particular number of iterations or other criteria have been met, etc. After the block 134 determines the best or optimal operating point of the analyzed points to use based on the objective function values, this point is provided to the expert system 100. At a block 138, the expert system 100 applies stored rules and logic to modify or fill out the solution provided by the block 134. The expert engine 100 may, for example, apply various stored rules to the operating point to modify the operating point based on those rules and/or to select specific equipment to use when implementing the operating point provided by the block 134 (such as selecting which equipment or fans within the plant to use to implement the solution provided by the numerical solver, etc.) A block 140 then provides this modified operating point (e.g., the plant set points and equipment operational conditions) as the optimal operating point of the plant to the plant controller 82 at a block 140. The controller 82 then uses those set points and equipment operating instructions to control ongoing or on-line operation of the plant at the optimal operating point. Of course, the flow chart of FIG. 5 is merely exemplary and other types of methodologies and routines for running an optimization cycle may be performed in addition to or instead of that specifically illustrated in FIG. 5.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A plant optimization system for use in controlling a plant having a steam cycle including a steam generator, a steam consumer and a condenser system coupled between the steam consumer and the steam generator, the plant optimization system comprising:

an optimizer including a calculation unit and an objective function, wherein the calculation unit analyzes each of a plurality of plant operating points associated with operation of the steam cycle to determine an initial plant operating point, the initial plant operating point including values for condenser system variables, that best satisfies the objective function, wherein each of the plurality of plant operating points includes a value for each of a set of steam cycle operating variables; and an expert engine that stores a set of rules and that uses the set of rules to adjust one or more of the values for the steam cycle operating variables associated with the initial plant operating point to determine an optimal plant operating point for use in controlling the plant.

2. The plant optimization system of claim 1, wherein the calculation unit is a mixed integer linear programming optimizer or a mixed integer non-linear programming optimizer.

3. The plant optimization system of claim 1, wherein the optimizer further includes a set of equipment models that model the operation of equipment within the steam cycle of the plant, and wherein the calculation unit uses the equipment models to predict the operation of the steam cycle of the plant at each of the plurality of plant operating points.

4. The plant optimization system of claim 1, wherein the calculation unit receives a set of constraints associated with operating limits of the plant, and wherein the calculation unit determines the plurality of plant operating points as plant operating points that do not violate any of the set of constraints.

5. The plant optimization system of claim 4, wherein the expert engine determines one or more of the set of constraints based on the rules within the expert engine and provides the one or more of the determined set of constraints to the calculation unit.

6. The plant optimization system of claim 1, wherein the optimizer receives a set of constraints associated with operating limits of the plant, a set of environmental conditions associated with operation of the plant and an output requirement of the plant, and wherein the calculation unit determines the plurality of plant operating points as operating points at which the plant operates at the environmental conditions to produce the output requirement without violating any of the set of constraints.

7. The plant optimization system of claim 1, wherein the objective function specifies a manner of evaluating a plant operating point and the calculation unit uses the objective function to analyze each of the plurality of plant operating points to determine an objective function value for each of the plurality of plant operating points, and selects one of the plurality of plant operating points as the initial plant operating point based on the objective function values determined for the plurality of plant operating points.

8. The plant optimization system of claim 1, wherein the steam consumer produces energy and wherein the objective function is associated with determining the least operating cost of the steam cycle of the plant per unit of energy output by the steam consumer.

9. The plant optimization system of claim 1, wherein the condenser system includes a plurality of electrically driven, air cooled condenser units and wherein at least one of the set of steam cycle operating variables is a condenser system variable defining the operation of the condenser system.

10. The plant optimization system of claim 9, wherein the condenser system variable includes a number of the electrically driven, air cooled condensers units to run.

11. The plant optimization system of claim 9, wherein the condenser system variable includes a speed at which to run a fan of one of the electrically driven, air cooled condenser units.

12. The plant optimization system of claim 9, wherein the condenser system variable includes a power budget to use to run one or more of the electrically driven, air cooled condensers units.

13. A plant control and optimization system for use in controlling a plant having a steam cycle that includes a steam generator and a plurality of electrically driven, air cooled condenser units, the plant control and optimization system comprising:
a plant controller coupled to the steam generator and to the electrically driven air cooled condensers to control the operation of the steam cycle based on a set of plant operating variable targets;
an optimizer that analyzes each of a plurality of plant operating points associated with the operation of the plant to determine an initial optimal plant operating point, wherein each of the plurality of plant operating points includes a value for each of a set of plant operating variables, at least one of the plant operating variables being a condenser variable associated with the operation of the electrically driven, air cooled condenser units within the steam cycle of the plant; and
an expert engine that stores a set of rules and that uses the set of rules and the values of the set of plant operating variables associated with the initial optimal plant operating point to produce the set of plant operating variable targets for use in the plant controller.

14. The plant control and optimization system of claim 13, wherein the optimizer includes a calculation unit and an objective function, wherein the calculation unit analyzes each of the plurality of plant operating points to determine the initial optimal plant operating point as the plant operating point that best satisfies the objective function.

15. The plant control and optimization system of claim 14, wherein the optimizer further includes a set of equipment models that model the operation of equipment within the steam cycle of the plant, and wherein the calculation unit uses the equipment models to predict the operation of the steam cycle of the plant at each of the plurality of plant operating points.

16. The plant control and optimization system of claim 14, wherein the calculation unit receives a set of constraints associated with operating limits of the plant, and wherein the calculation unit determines the plurality of plant operating points as plant operating points that do not violate any of the set of constraints.

17. The plant control and optimization system of claim 16, wherein the expert engine determines one or more of the set of constraints based on rules within the expert engine and provides the one or more of the determined set of constraints to the calculation unit.

18. The plant control and optimization system of claim 14, wherein the optimizer receives a set of constraints associated with operating limits of the plant, a set of environmental conditions associated with operation of the plant and an output requirement of the plant, and wherein the calculation unit determines the plurality of plant operating points as operating points at which the plant operates at the environmental conditions to produce the output requirement without violating any of the set of constraints.

19. The plant control and optimization system of claim 13, wherein one of the plant operating variable targets includes a number of the electrically driven, air cooled condensers units to run.

20. The plant control and optimization system of claim 13, wherein one of the plant operating variable targets includes a speed at which to run a fan of one of the electrically driven, air cooled condenser units.

21. The plant control and optimization system of claim 13, wherein one of the plant operating variable targets includes a power budget to use to run one or more of the electrically driven, air cooled condensers units.

22. A plant control and optimization system for use in controlling a plant having a plant steam cycle with a steam generator, a steam consumer and a condenser system having a plurality of electrically driven, air cooled condenser units coupled between the steam consumer and the steam generator, the plant control and optimization system comprising:
an optimizer that analyzes a plurality of operating points associated with the operation of the steam cycle to determine an optimal operating point of the steam cycle, wherein each of the plurality of operating points includes a different set of values for one or more steam cycle operating variables, the steam cycle operating variables including at least one condenser system operating variable; and
a plant controller coupled to control the steam generator and the electrically driven, air cooled condensers to thereby control the operation of the plant steam cycle, the plant controller further coupled to the optimizer to receive and use the values for the one or more plant steam cycle operating variables associated with the optimal operating point to control the operation of the plant steam cycle.

23. The plant control and optimization system of claim 22, wherein the optimizer includes a calculation unit that determines a set of operational values associated with an initial optimal operating point and an expert engine that stores a set of rules and that uses the set of rules to adjust the set of operational values associated with the initial optimal operating point to determine the steam cycle operating variables values for the optimal operating point.

24. The plant control and optimization system of claim 23, wherein the calculation unit stores and uses an objective function to determine the initial optimal operating point.

25. The plant control and optimization system of claim 24, wherein the steam consumer produces energy and wherein the objective function is associated with determining the least operating cost of the steam cycle per unit of energy output by the steam consumer.

26. The plant control and optimization system of claim 22, wherein the at least one condenser system operating variable includes a number of condenser units to run.

27. The plant control and optimization system of claim 22, wherein the at least one condenser system operating variable includes a speed at which to run one or more fans of one or more of the condenser units.

28. The plant control and optimization system of claim 22, wherein the at least one condenser system operating variable includes a power budget to use to run one or more of the condenser units.

29. A method of optimizing control of a plant having a steam cycle with a steam generator, a steam consumer and a condenser system, the method comprising:
determining a plurality of plant operating points, each of the plurality of plant operating points including one or more operating variables associated with operation of equipment within the steam cycle of the plant;
analyzing each of the plurality of plant operating points using an objective function to determine one of the plurality of plant operating points as an initial optimal operating point that best satisfies an objective function;
determining a particular set of plant control target values to use in controlling the plant based on the initial optimal operating point, the particular set of plant control target values including target values for use in controlling the condenser system of the plant; and
providing the particular set of plant control target values to a process controller for use in controlling the plant.

30. The method of optimizing control of a plant of claim 29, wherein the condenser system includes a plurality of electrically driven, air cooled condenser units coupled between the steam consumer and the steam generator, and wherein determining the particular set of plant control target values includes determining a particular number of condenser units to run within the plant.

31. The method of optimizing control of a plant of claim 29, wherein the condenser system includes a plurality of electrically driven, air cooled condenser units coupled between the steam consumer and the steam generator, and wherein determining the particular set of plant control target values includes using a set of stored rules and the initial optimal operating point to determine an identification of the particular condenser units to run within the plant.

32. The method of optimizing control of a plant of claim 29, wherein the condenser system includes a plurality of electrically driven, air cooled condenser units coupled between the steam consumer and the steam generator, and wherein determining the particular set of plant control target values includes using a set of stored rules and the initial optimal operating point to determine a speed at which to run fans of the condenser units within the plant.

33. The method of optimizing control of a plant of claim 29, wherein the condenser system includes a plurality of electrically driven, air cooled condenser units coupled between the steam consumer and the steam generator, wherein the initial optimal operating point includes a power budget for use in running the condenser system and wherein determining the particular set of plant control target values includes using a set of stored rules and the initial optimal operating point to determine a speed or a number of the condenser units to run within the plant based on a power budget.

34. The method of optimizing control of a plant of claim 29, wherein the condenser system includes a plurality of electrically driven, air cooled condenser units coupled between the steam consumer and the steam generator, wherein the initial optimal operating point includes a range of a number of condenser units to run within the plant and wherein determining the particular set of plant control target values includes determining a particular number of condenser units within the range of the number of condenser units to run within the plant.

35. The method of optimizing control of a plant of claim 34, wherein determining the particular set of plant control target values further includes determining an identity of the condenser units to use as the particular number of condenser units to run within the plant.

36. A plant optimization system for use in controlling a plant having a steam cycle including a steam generator, a steam consumer and a condenser system coupled between the steam consumer and the steam generator, the plant optimization system comprising:
an optimizer including a calculation unit and an objective function, wherein the calculation unit analyzes each of a plurality of plant operating points associated with operation of the steam cycle to determine an initial plant operating point that best satisfies the objective function, wherein each of the plurality of plant operating points includes a value for each of a set of steam cycle operating variables, wherein the calculation unit receives a set of constraints associated with operating limits of the plant; wherein the calculation unit determines the plurality of plant operating points as plant operating points that do not violate any of the set of constraints; and an expert engine that stores a set of rules and that uses the set of rules to adjust one or more of the values for the steam cycle operating variables associated with the initial plant operating point to determine an optimal plant operating point for use in controlling the plant, wherein the expert engine determines one or more of the set of constraints based on the rules within the expert engine and provides the one or more of the determined set of constraints to the calculation unit.

* * * * *